Nov. 21, 1967  H. KABEL  3,353,227
DEVICE FOR TIEING CABLE HARNESSES
Filed April 9, 1965  6 Sheets-Sheet 1
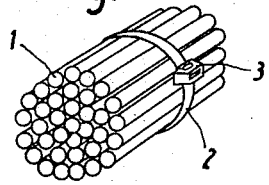
Fig.1
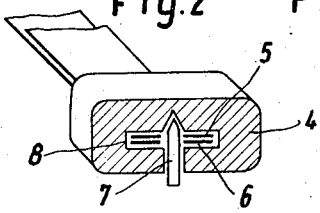
Fig.2
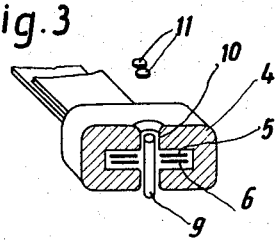
Fig.3
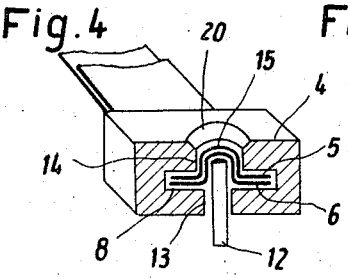
Fig.4
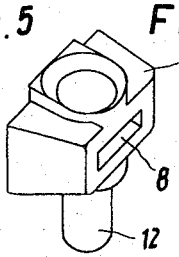
Fig.5
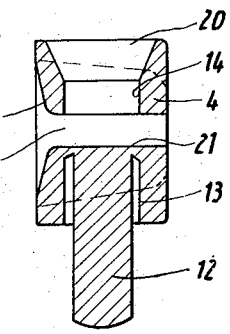
Fig.6
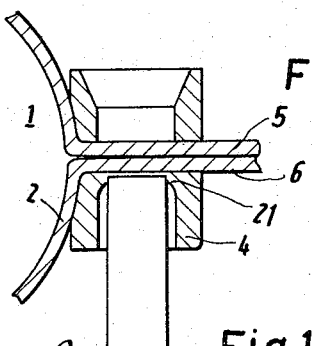
Fig.7  Fig.8
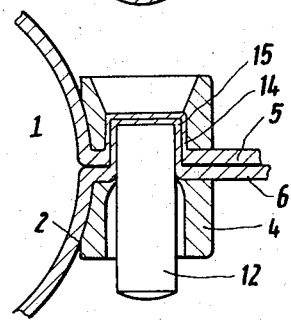
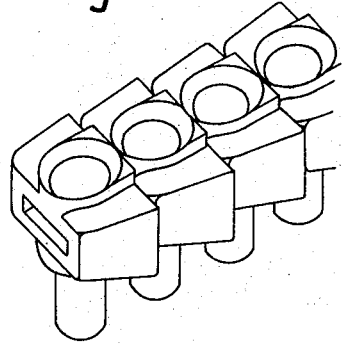
Fig.9  Fig.10  Fig.11

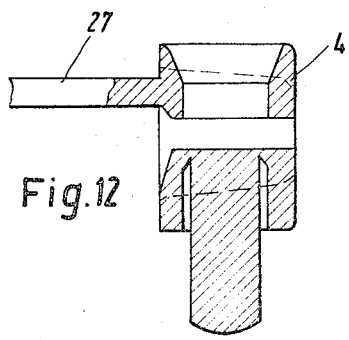
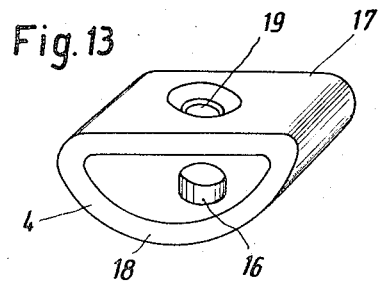
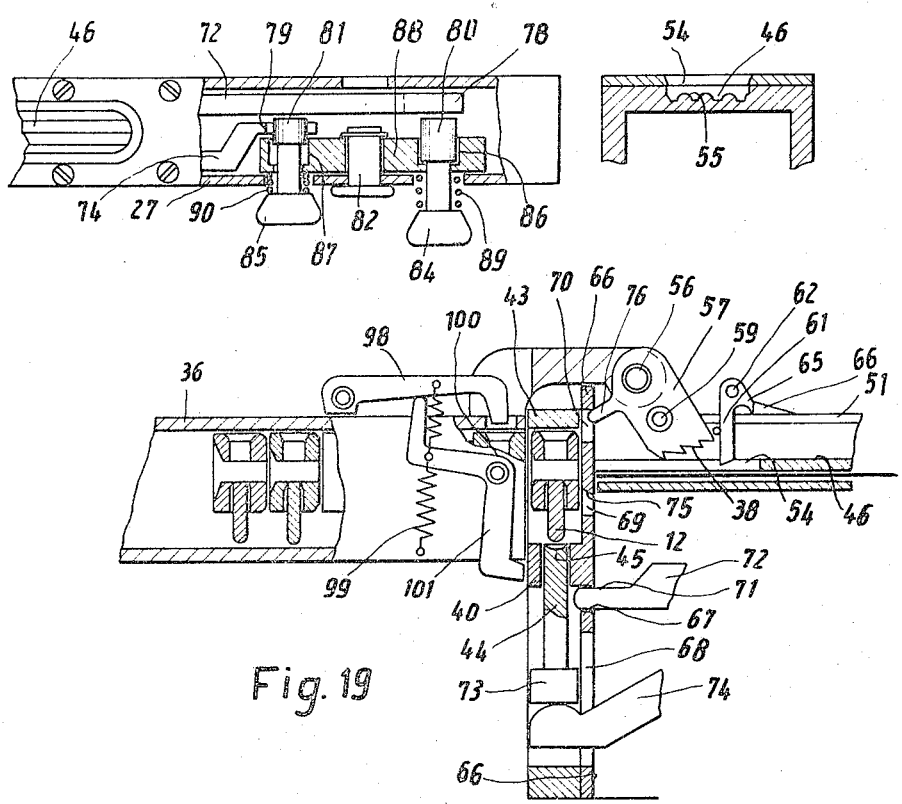

Nov. 21, 1967   H. KABEL   3,353,227
DEVICE FOR TIEING CABLE HARNESSES
Filed April 9, 1965   6 Sheets-Sheet 6
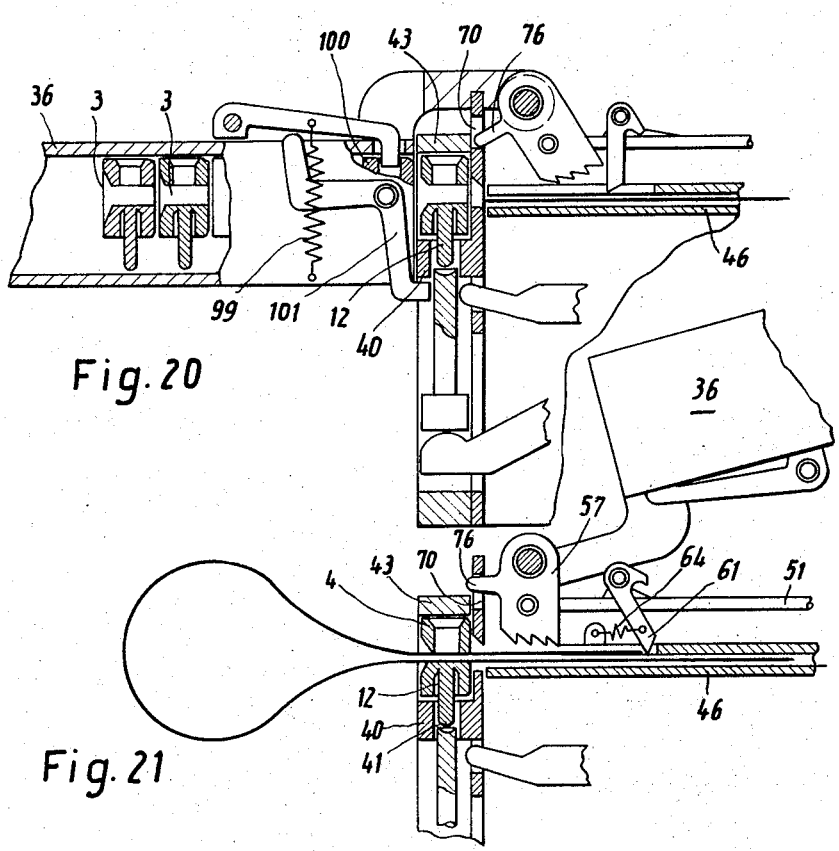
Fig. 20
Fig. 21
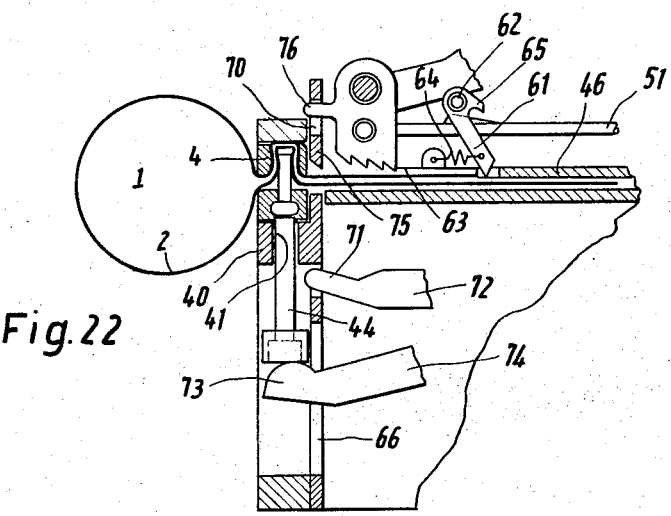
Fig. 22

United States Patent Office 3,353,227
Patented Nov. 21, 1967

3,353,227
DEVICE FOR TIEING CABLE HARNESSES
Heinrich Kabel, Quickborn, Holstein, Germany, assignor to Paul Hellermann G.m.b.H., Pinneberg, near Hamburg, Germany
Filed Apr. 9, 1965, Ser. No. 446,855
5 Claims. (Cl. 24—16)

The present invention concerns a method and apparatus for tieing cable harnesses or the like with a strap which is placed around them which has its ends held fast in a lock.

A large number of such devices are already known. The difficulty in this connection is always to assure a dependable and nevertheless simple fastening in the lock of the ends of the strap which has been placed around the cable harness which is to be tied. This has been done for instance by twisting the ends of the strap together, by clamping them in the lock by means of a screw, by plastically deforming them together with the lock (crate straps), by winding them on a mandrel in the lock ("tubular straps") or by providing the straps at given intervals with holes or other recesses which are either continuous or present only in the surface and into which locking members associated with the lock engage.

When a strap which has the same cross-section over its entire length is used, and therefore a strap without holding recesses, the lock is generally relatively complicated, since the holding forces must then be applied by friction or deformation. On the other hand, those devices in which the strap is provided with holding recesses have the disadvantage that the strap is relatively expensive although the lock can be of simple construction.

For various purposes of use and as a function of the material of which the straps used consists, such devices of this type have gained a foothold in actual practice.

In all cases it is desirable to be able to take the strap from an endless roll. One normally, however, proceeds in the manner that predetermined lengths of strap are functionally combined, directly for use, with a lock. This has the disadvantage that the length of strap, in view of the great variation in the diameter of the cable harnesses and since a certain amount must protrude for the locking, must always be made ample, thus resulting in considerable losses, as well as the fact that in view of the different lengths required, a substantial amount of material must be kept in stock. The losses in material are particularly disadvantageous when expensive materials are employed, for instance polyamide plastics. However, these materials are practically indispensable for cable ties since, in contradistinction to polyvinyl chloride and polyethylene, they have the resistance to high temperatures required in airplane construction and, in contradistinction to metal, are resilient and insulating.

For example, there are already known cable straps of this material which consist of a length of strap on one end of which there is located a lock through which the other end of the strap is passed, and after the locking, secured therein by twisting. In order to avoid large losses of material, it is always necessary in the case of this strap to maintain different sizes in stock, as a result of which production costs and stock costs are increased.

It is furthermore known that it is possible to form individual conductors into cable trunks by means of perforated cable straps. The perforated strap, generally made of non-rigid polyvinyl chloride, is provided over its entire length with holes spaced equally apart through which buttons having the shape of collar buttons are pressed. As a result of the softness—which is necessary in order to be able to push the buttons through—it frequently happens that the strap is subjected to excessive elongation and that the holes which were originally round become deformed and elongated. In such case, the buttons may jump out in case of vibration so that these ties are too undependable for many fields of use. For this reason, their use is greatly limited. Furthermore, their use is also limited by the fact that due to the required softness, the straps can consist practically only of polyvinyl chloride, which material, however, is unsuitable for operating temperatures above 70° C.

By the present invention, there is provided a method of tieing cable harnesses by means of a strap which is placed around same and the ends of which are accommodated in and held fast by a lock which is characterized by its particular simplicity. It has the advantage, furtheremore, that it can be readily made of materials which have higher resistance to temperature, both plastics and metals, and that the strap and the lock can be manufactured individually and combined so one can work from a roll. Furthermore, the strap can be of constant cross-section over its entire length so that it is cheap to produce.

The method of the invention is characterized by the fact that the previously unperforated ends of the strap are engaged and penetrated or pierced by a pin and the latter held fast in the lock. There is thus obtained a form-locked locking of the ends of the strap in the lock, this being obtained in a very easy manner, in that, namely, the locking pin simultaneously serves to create in the strap itself the cooperating formation necessary for the form-locked connection. In contradistinction to the use of perforated straps, the strap in accordance with the present invention can be tightened to any desired extent without one being restricted upon closing by the distance between existing holes, and furthermore no specific minimum softness of the material of which the strap is made is required, as is necessary when buttons are to be passed through the holes of a perforated strap.

The method can be carried out in accordance with the invention in the manner that the passage hole for the locking pin is punched into the ends of the strap by the pin in cooperation with a bore acting as die in the lock itself; however, there is particularly advantageous an embodiment in which the formation of the passage hole in the ends of the strap is associated with plastic deformation. In this way, namely, the edges of the holes are rounded so that they cannot easily tear. It is particularly advantageous in this connection if a passage hole is not actually produced but rather if the pin, in cooperation with a correspondingly larger bore in the lock, merely deforms the strap into cup-shape at its passage point so that the strap is not injured and no reduction in the cross-section of the band occurs. For this purpose, the strap advisedly consists of material which can be deep-drawn and in particular of polyamide. Its cross-section is preferably trapezoidal. The edges can also be rounded.

The lock consists in accordance with the invention of two bridges which define a slot to receive the ends of the strap and which are rigidly connected with each other and have one or more boreholes extending transverse to the slot, each of which boreholes receives a pin. The holding of the pin in the lock can be achieved in accordance with the invention by friction in a narrow borehole, but it is frequently more advantageously obtained by a form-locked connection. In accordance with the invention, this form-locked connection can be produced by plastic deformation of the parts concerned during the closing process. This is done with particular advantage in the manner that portions of the boreholes of the lock are made of relatively large diameter and the material of the cold-deformable pin is forced by axial compression during the closing process into said widened portions thus producing a locking action.

One particularly advantageous form of the strap lock is characterized by the fact that the locking pin in the original condition of the lock is integral with the latter, assuming a position which corresponds to its starting position upon the closing process, and that it is connected with the rest of the body of the lock by bridges of material which can easily be broken. This result can be obtained relatively easily by the injection molding of locks of plastic.

The invention furthermore comprises a tool by which the lock of the invention can be closed. This tool is characterized by a holding device for the lock, by a tensioning device for the strap, the ends of which are passed through the lock, by a thrust device for the pin and possibly by cutting means for cutting off the ends of the strap extending beyond the lock after the locking.

It is particularly advantageous for the tool also to contain a roll for the strap from which the strap is conducted to the holding device of the lock, as well as a holding clamp for the loose end of the strap which has been brought back to the rear. In this connection, the tensioning of the strap can, in accordance with the invention, be effected by backward rotation of the roller strap, while the loose end is held by the holding clamp.

The thrust or pushing device for the pin consists advantageously of a pressure ram which is movable in transverse direction to an abutment against which the lock lies.

In accordance with the invention, the tool can be combined with a magazine for the locks, from which, after each closing process, a new lock is transferred automatically or semi-automatically into the holding device of the tool. When locks which are not simultaneously combined with a pin are used, a magazine for pins can also be provided.

The new method makes possible, particularly in combination with the tool of the invention, the rapid production of firm cable harnesses, even by unskilled workers. The work can be carried out without difficulty even at places which are difficult of access. The tieings produced in this manner satisfy all mechanical and thermal stresses occurring, such as for instance known in airplane construction, vehicle construction or construction of electrical apparatus or appliances.

Further details of the method and apparatus of the invention will become evident from the following description of preferred embodiments, given by way of example in the drawing, in which:

FIG. 1 is a perspective diagrammatic showing of a cable tie;

FIGS. 2 to 4 are perspective diagrammatic showings of different locks, in accordance with the invention partially in section;

FIGS. 5 and 6 are an elevation in perspective and a cross-section through a particularly preferred embodiment of the lock;

FIGS. 7 to 9 are cross-sections through said lock in different stages of the process;

FIG. 10 is a perspective view of a lock corresponding to the lock of FIG. 5 with two locking pins and boreholes;

FIG. 11 shows a number of interconnected locks;

FIG. 12 is a section through a lock corresponding to the lock of FIG. 6, which is integral with a strap;

FIG. 13 shows another embodiment of the lock;

FIGS. 17 to 22 are partial sections through the tool.

Figure 14:
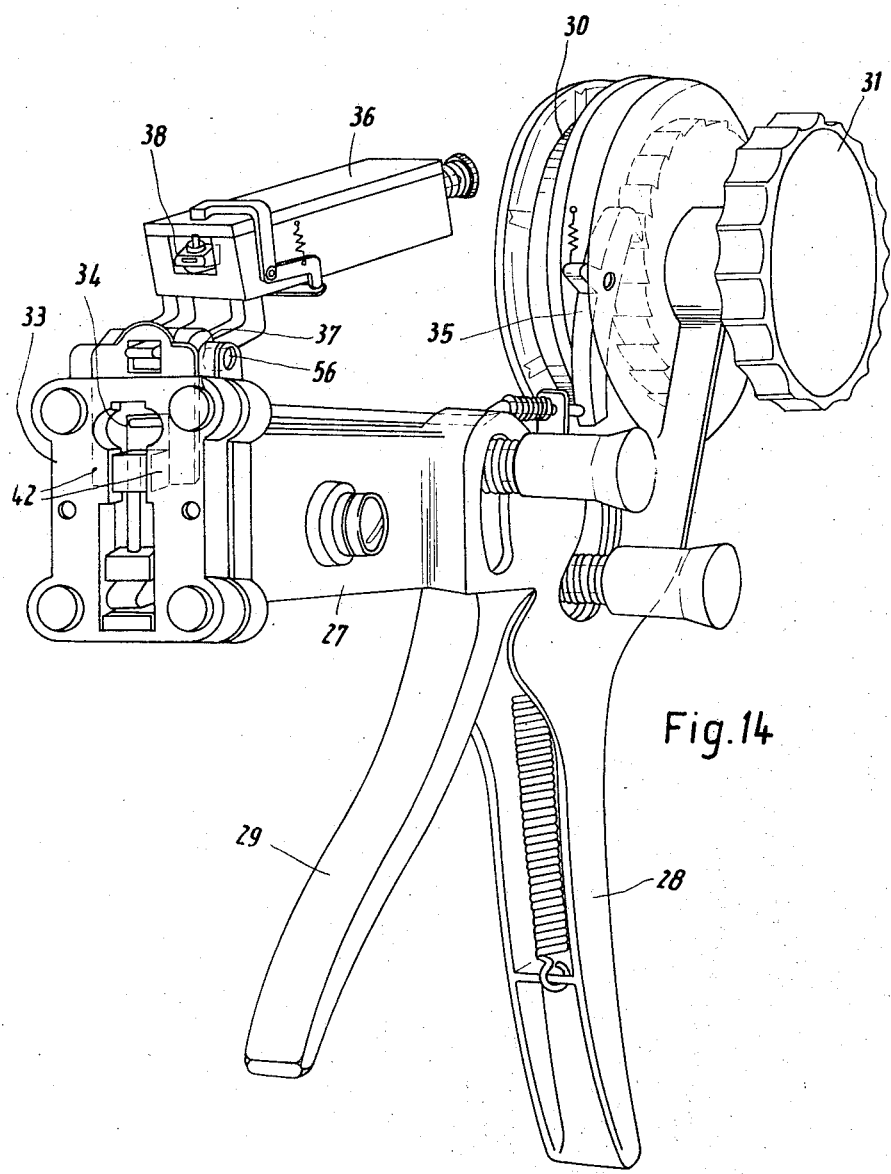
FIG. 14 is a perspective showing of a tool for the carrying out of the method of the invention.

FIG. 1 shows schematically an elongated bundle 1 of electric conductors which are surrounded by the strap 2 whose ends are held by the lock 3, the conductors thus being clamped and held as a cable harness. This strap can furthermore be provided wtih an attachment base for the cable harness by means of which the harness can be fastened for instance to a structural part. Such fastening devices in combination with cable ties are well known.

The strap used with cable harnesses advantageously consists of an insulating, resilient plastic. In order that the insulations of the conductors not be damaged, it may be of trapezoidal cross-section and have rounded corners. When used for hose clamps and similar purposes, the strap can also consist of metal.

The cross-sections shown in FIGS. 2 to 4 through different locks illustrate different methods of attaching the strap ends in accordance with the invention. The locks consist in all cases of a lock body 4 which consists of two bridges which define a straight passageway or slot 8 which serves to receive the ends 5 and 6 of the strap. As will be evident from the drawing, the lock body 4 is arranged so that the passageway 8 extends transversely to the longitudinal direction of the elongated bundle of cables. A borehole to receive a pin which pierces the ends of the strap extends transversely through the slot 8.

In FIG. 2, the pin 7 is pointed. It is pushed forcefully forward through the lock body 4 which is made of sufficiently resilient material that it need not be provided with an initial bore. However, it is more advantageous for at least narrow boreholes to be initially present. The pin is then held by friction against the boreholes whose diameter is smaller than the diameter of the pin. The lock can consist in this connection of resilient plastic or metal and the pin of steel.

In the embodiment shown in FIG. 3, the passage borehole is already present in advance in the lock. The side of the borehole which is the second side to be perforated by the pin 9 has a sharp inner edge 10 which in cooperation with the front edge of the pin 9 serves as cutting edge. A sharp passage hole through the ends of the strap is produced. 11 are pieces of the strap which have been punched out.

In order to avoid a weakening of the strap and in order to achieve a harmonious transfer of the forces between the strap and the lock, it is advantageous for the edges of the hole to be imparted, to a certain extent, a cup-shaped development. Such an embodiment is shown in FIG. 4. In this case, the pin 12 lies in a pair of coaxial boreholes 13 and 14. While the diameter of the borehole 13 may be somewhat adapted to the diameter of the pin, the borehole 14 has a diameter which is relatively large so that upon the pushing-through of the pin 12, the strap is pulled into said larger borehole and is deep-drawn in cup-shape, in the manner indicated at 15. It is clear that this type of deformation results in the least weakening of the cross-section of the strap, since no damaging of the strap at all takes place.

During the further course of the closing method, which is shown in an intermediate stage in FIG. 4, the final stage shown in FIG. 9 and which will be described further below is reached.

The purpose pursued by the embodiment shown in FIG. 4 can be attained in part—and in many cases, this will be sufficient—also in the manner that only the edges of the hole are first of all deformed in the manner shown in FIG. 4 and after this deformation, the strap is completely pierced through. However, exclusive plastic deformation as shown in FIG. 4 is preferred and in the following reference will be had in particular to this method. The following explanations of additional details can, however, be transferred extensively also to other embodiments without going beyond the scope of the present invention.

In FIG. 13, there is shown the embodiment of a lock in which the pin 16 is integral with the body 4 of the lock. In order to close the lock, the upper and lower bridges 17 and 18 of the lock are pressed together in the axial direction of the pin 16 and of the borehole 19. The pin 16 passes through the strap lying between the bridges 17 and 18, penetrates into the borehole 19 and is held fast here either by the plastic deformation of the lock which has taken place or in any other manner, for instance in the same manner as the pin 12 in FIG. 9.

The connecting of pin and lock-body can be effected in particular also by form-locked interlocking of corresponding formations on the pin and on the periphery of the boreholes which receive it. Thus, for instance, the pin could be provided with circumferential elevations which grip in corresponding peripheral grooves in the borehole after the body of the lock or the pin has been elastically deformed by the introduction of the pin.

The form-locked connection can, however, also be brought about in accordance with the invention in the manner that the lock-body or the pin is plastically deformed during the closing process. For this purpose, the boreholes can be provided with peripheral widenings into which the cold-deformable material of the pin is forced by the axial pressure exercised upon the closing process.

One such peripheral widening is for instance the conical portion 20 of the borehole in FIG. 4.

A particularly preferred form of the lock in accordance with the invention is shown in FIGS. 5 to 9. The lock consists in this case of a lock-body 4 which has a lower borehole 13 and an upper borehole 14 which are coaxial to each other. The pin 12 is integral with the body 4 of the lock. In the starting position required for the closing process, it is located in the borehole 13, connected with its wall by thin bridges of material 21. These bridges of material can extend circumferentially or also consist of individual radial arms.

The diameters of the boreholes 13 and 14 are greater than the outside diameter of the pin 12. The borehole 14 has at its top a conical outward flaring 20. Facets 22 extend to the slot 8 serving to receive the ends 5 and 6 of the strap, on the side on which the cable harness 1 is to be subsequently wrapped by the strap 2. These facets permit first of all a better application of the strap against the round cross-section of the cable harness in this region, and furthermore facilitate the introduction of the strap into the slot 8.

The lock consists preferably of a type of polyamide and is produced by injection molding. The strap used in combination with it may also consist of polyamide.

In FIGS. 7 to 9, the method of locking will now be explained. The strap 2 is placed around the cable harness 1. The ends 5 and 6 of the strap are extended through the slot 8 of the slot-body 4. The strap is then tensioned, the lock being pressed against the cable harness. This starting stage is shown in FIG. 7.

Thereupon a pressure is exerted on the pin 12 of the type shown in FIG. 8 so that the bridges of material 21 break in the manner already indicated in FIG. 7, and the pin 12 penetrates into the borehole 14 while cupping 15 the ends 5 and 6 of the strap.

FIG. 9 shows the final position of the process. The pin 12 has been pushed further upward by the ram 23 until it has come, with the interposition of the deep-drawn part 15 of the strap, against the abutment 24. The ram 23 thereupon continues its axial pressure. This further advance causes the deformation of the pin 12 at the points 25 and 26 into the regions of larger diameter of boreholes 13 and 14. It is clear that in this way a dependable form-locked connection of the pin 12 with the body 4 of the lock has been effected. It is impossible to loosen the pin from the lock without destroying it. The ends 4 and 5 of the strap are dependably held in the lock. By their deformation at the edges of the hole, tearing-out is made very difficult. If greater holding forces are required, two lock pins can be provided, as in the case of the lock shown in FIG. 10.

As shown in FIG. 11, a large number of locks can be produced in a single injection molding process. The individual locks—as known in connection with other corresponding mass production articles produced by injection molding—are connected to each other by bridges of material which can very easily be broken. In this way, they can be handled very easily. They can also be stored in this form.

Of course, they can also be connected with each other in such a manner that their side surfaces adjoin each other. This form of "lock-strip" will be selected when the magazine which receives them is to discharge from the side into a corresponding tool.

While in the above embodiments it has always been assumed that the strap and the lock are produced separately, FIG. 12 shows a form which is desirable in many cases and in which strap 27 of reasonable length is connected with the body 4 of the lock. This combined strap can be produced for instance by an individual injection molding process.

The forms of lock described with reference to FIGS. 5 to 12 are advantageous in particular in combination with a specific tool for the production of the corresponding ties, the said tool being provided in accordance with the invention with a holding device for the lock, a tensioning device for the strap, a pushing device for the pin and possibly means for cutting off the protruding ends of the strap. Due to the fact that the closing of the lock in accordance with the invention proceeds particularly rapidly (no screws need be tightened or no strap ends wound on a mandrel), the tieing of cable harnesses by the tool of the invention is very rapid and simple. If, in accordance with a special feature of the invention, the tool is also provided with magazines for the strap and the locks, the operator's equipment consists solely of such a tool. In this way the operation is greatly simplified and the danger of errors reduced.

In FIG. 14, there is shown in perspective a tool which combines all the functions to be carried out and is provided with strap and lock magazines. In simpler embodiments of the tool, it is readily possible to omit individual features since they are substantially independent of each other, although described below in connection with each other wtih reference to this tool.

The tool has the form of manual tongs with a tool body 27 which is rigidly connected with the handle 28. A second handle 29 is movably supported in the tool body 27. By suitable transmission means in the tool body, the handle 29 can be connected with the means for the closing of the lock and the cutting off of the protruding ends of the strap, as well as with the means for holding fast the lock which is being worked on at the time.

In the rear part of the tool, there is supported the roll of strap 30. This roll of strap is connected with a knurled wheel 31. The feed end 32 of the strap is fed through a channel in the rear of the body 27 of the tool to its front 33, being fed there into the holding opening 34 for a lock.

The end of the strap can be tensioned by turning the roll 30 by means of the knurled wheel 31. The roll of strap is connected with a ratchet 35 which prevents the roll of strap from turning backwards out of the tensioned condition.

A magazine 36 is connected with the tool. In the case of the embodiment shown, the connection is formed by a hinge 37. The magazine 36 can be swung around said hinge from its rest position (FIGS. 14 to 16) into its active position (FIG. 20) with its mouth or aperture 38 in front of the window 34 so as to deposit a lock there.

The further structural details of the tool will now be described with reference to the cross-sectional drawings 15 to 22.

The body 27 of the tool is a hollow pressure or die-casting. The holding window for the locks is formed on top and at the sides by rigid housing parts 42, 43, and of parts which are directly connected therewith. The side parts 42 form a guide for a slide block 40 which forms the bottom of the opening 34 and is movable by a certain amount up and down in said guides within the front surface of the tool. The slide block has a central bore. A ram 44 which is also movable upward and downward extends from the bottom through said central bore. Said ram preferably has a convex-curved front surface 45. It acts as thrust tool 23 of FIG. 9, while the upper part 43 of the opening forms the abutment corresponding to the part 24 of FIG. 9.

Into the opening, there discharges a channel 46 which extends on the back of the tool 27 from the region of the roll of strap 30 to the window openings 34 on the front side of the tool. This channel serves to receive the strap 32 which is to be fed from the roll to the window opening.

The roll is supported in a mount 47 in the rear part of the tool. It is placed interchangeably on a roller support in a manner not shown in the drawing, but known from corresponding devices, and is connected for joint rotation with the shaft on which the ratchet wheel 48 and the knurled wheel 31 are also firmly mounted.

With the ratchet wheel 48, there cooperates a pawl 49 which is held in engagement by a spring 50 unless a bar 51, which will be described below, places it out of operation by pressing against its rear portion 52. The pin 53 of the pawl is held fast in the housing.

In the front region of the channel 46, there is located a window 54 which opens toward the top and through which the strap moving in the channel is accessible. FIG. 18 shows a cross-section through the channel 46 at the position of said window 54. The bottom of the channel is provided with elevations and depressions 55 extending in longitudinal direction which are intended to reduce the rubbing of the strap in the channel in general or else in particular at this place.

The channel 46 has at its front portion a height which permits it to receive two thicknesses of strap, one above the other. In this region of the channel, a ratchet locking pawl 57 which is firmly mounted on the tool body by the pin 56 engages through the window 54, the teeth 58 of said pawl being directed backward. This pawl is of such a shape that in its forward position, the surface of its teeth comes against the upper of the two straps located in the channel in such a manner that it prevents its displacement in forward direction.

Figure 16:
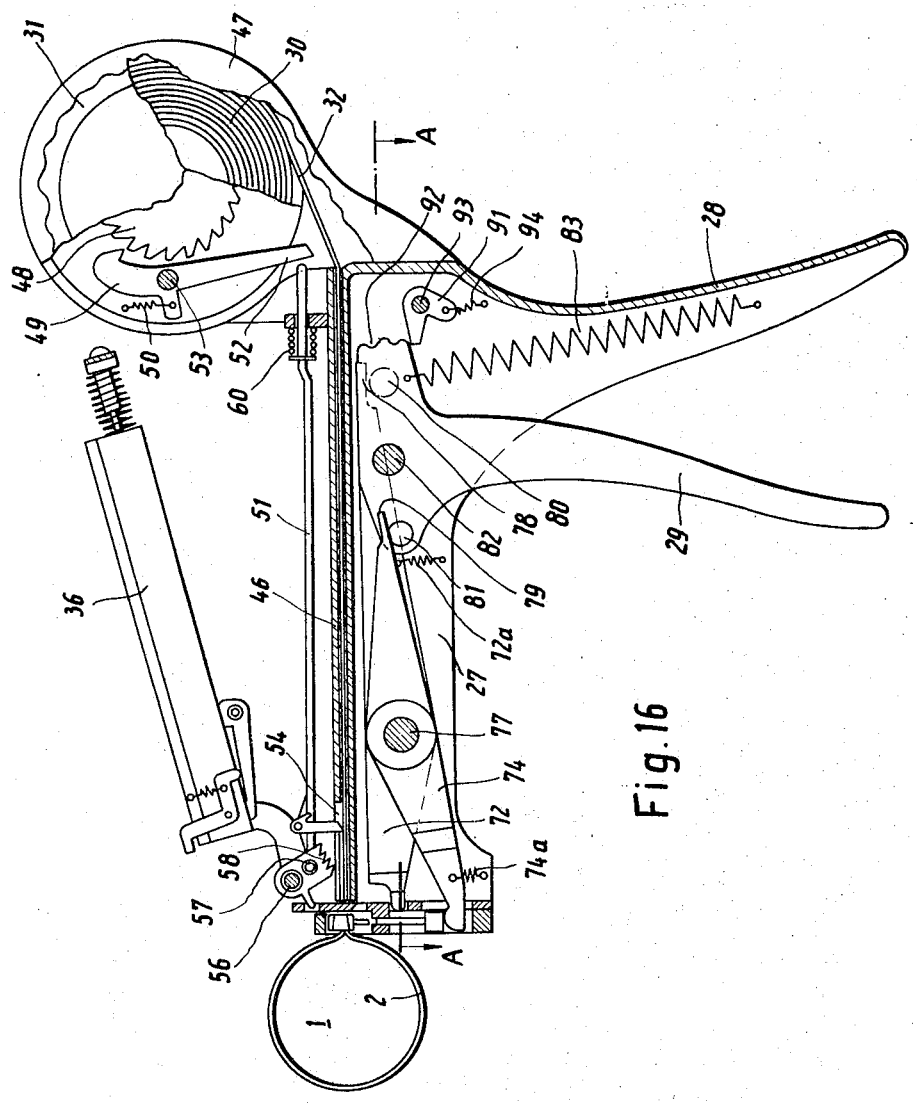

In a borehole 59 (FIG. 19), in the pawl 17, there is swingably supported the end of the rod 51. A swinging movement of the pawl 57 therefore results in a forward or backward movement of the rod 51. The rod 51 is urged forward by a spring 60 (FIG. 16). In this way, the pawl 57 is also normally held in its active position. At the same time, therefore, the rod 51 is in the position in which it permits the locking pawl 49 to engage in the ratchet wheel 48.

Behind the pawl 57, a pawl 61 (FIGS. 19, 22) which is rotatable about a pin 61 fixed in the housing, extends into the window 54. The end of said pawl 61 lies in the upper region of the window 54, in which a strap end 63 which has been pushed back in the channel from the front must lie. A spring 64 (FIG. 22), not indicated in all figures, pulls the part of the pawl extending into the window forward.

In its upper region, the pawl 61 has a rearward-extending locking projection 65 (FIGS. 19, 22). This locking projection cooperates with a step 66 on the rod 51. In its active position, it prevents the advancing of the rod 51 under the action of the spring 60 and thus the entry into action of the pawl 57.

The slide block 40 is connected with a pusher 66 (FIG. 19) which extends practically over the entire height of the front face of the tool and is guided therein. It has a number of cutouts 67, 68, 69 and 70 (FIG. 19).

Into the cutout 67, there engages the front end 71 of the lever 72. The raising and lowering of the lever end 71 effects the raising and lowering of the pusher 66, together with the slide block 40.

Through the window 68, the front end 73 of the lever 74 extends. If the lever end 73 moves upward, the pin 44 is also moved upward.

The cutout 69 of the pusher 66 serves—as shown in FIGS. 20 to 22—for the passage of the strap 32. The upper edge 75 (FIG. 19) of the cutout 69 is developed as a knife edge which cooperates with the front edge of the lower wall of the channel 46.

The cutout 70 of the pusher 66 receives a projection 76 (FIGS. 19 to 22) of the pawl 57. If the pusher 66 is moved downward, the pawl 57 is swung rearward and therefore into inactive position by cooperation of the upper edge of the cutout 70 with the projection 76. The cutout 70 is sufficiently large that upon the upward movement of the pusher 66, the lower edge of the cutout 70 does not collide with the projection 76 of the pawl held in inactive position.

The levers 72 and 74 are supported in the housing 27 on the pins 77 and their rear ends 78 and 79 extend into the region of coupling members or pins 80 and 81 which extend in the head of the handle 29 which is supported around the pin 82 which is fixed in the housing. This handle is pulled forward by the tension spring 83.

The levers 72 and 74 are held in their rest position by springs 72a and 74a, in which position the front portion of the lever 74 is pulled downward and the front portion of the lever 72 upward.

The pins 80 and 81 (FIG. 17) extend outward through the housing 27 and bear on the outside operating knobs 84 and 85. They are displaceably supported in boreholes 86 and 87 in the head 88 of the handle 29. Springs 89 and 90 respectively hold them in a position in which they are not in the way of the rear ends 78 and 79 of the levers 72 and 74 respectively. By pressing on the knob 84 or 85, the handle 29 can be brought as desired into communication via the pins 80 and 81 respectively with the swivel levers 72 and 74 respectively.

The handle 29 is provided with a known safety device which consists of a pawl 91 and a notching 92. The pawl 91 is swingable about a pin 93 which is fixed in the housing, and it is pressed by the spring 94 into the notching. This has the result that the handle can return from an actuated position into the rest position only when the notching 92 has moved enirely past the pawl and the handle has therefore been moved back all the way.

The magazine 36 (FIG. 14) is swingable in the hinge 37 around the pin 56 (FIG. 15) which is fastened in the housing. The magazine consists essentially of a housing which represents a prismatic guide 95 for a row of locks 3. This row of locks is pressed by the spring 96 to the mouth 38 of the magazine where in each case the first lock is locked in its position by a special device. The arm 97 on which the magazine is seated is of such dimensions that the opening 38 can be swung precisely in front of the window 34 in the front surface of the tool.

The method of locking for the first lock contained in the magazine can be noted from FIGS. 19 and 20. A releasable arresting means or locking latch 98 engages under the force of a spring 99 into the borehole 14 of the first lock 100, provided that it is not raised by the lever 101.

Figure 15:
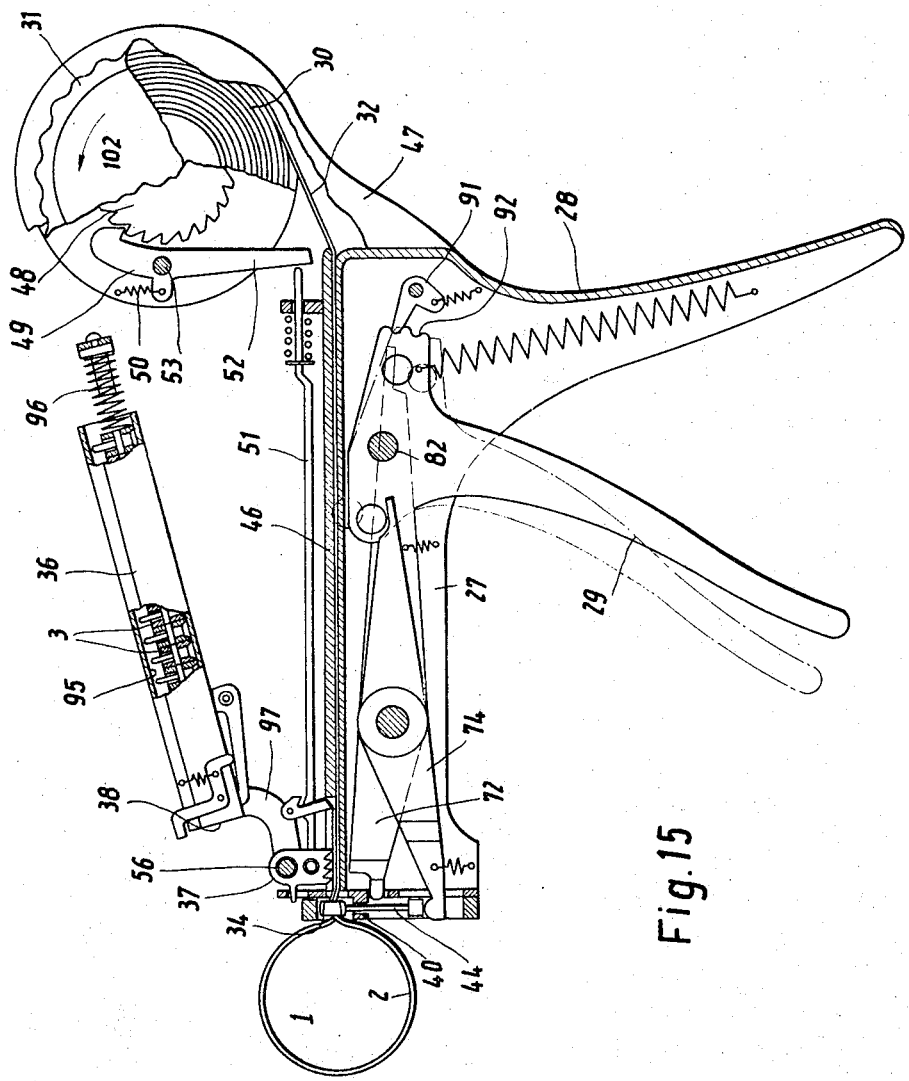
FIGS. 15 and 16 are longitudinal sections through the entire tool.

The lever 101 extends in its position of rest shown in FIG. 15 in which the magazine is locked, beyond the front surface of the magazine 36 at a place at which the slide block 40 is located corresponding to the front surface 33 of the tool when said block is pulled downward by the lever 72.

The tool operates in the following manner:

(1) Insertion of a lock into the tool: Since the distance between the upper part 43 of the window 34 and the slide block 40 in the rest position of the latter corresponds only to the size of the body 4 of the lock without the pin 12, the slide block must be moved down for the insertion of a lock. This is done in the manner that the handle 29, by depressing the knob 81/85 is brought into contact with the lever 74 and then pulled. In this way, there is obtained the position of the slide block shown in FIG. 19.

The magazine 36 is now swung in front of the window 34. The protruding end of the lever 101 is forced back by the slide block 40 so that the first block 100 in the magazine is unlocked and is pushed into the open window by the pressure exerted by the spring 96 (FIG. 19).

When the handle 29 is released, the slide block 40 moves upward so that its bore 45 surrounds the pin 12 and thus captures and holds the lock.

FIG. 20 shows clearly that the gripping block 40 has thus moved out of the region of action of the lever 101. Under the action of the spring 99, the latter moves rapidly forward so that the lock 100, which is now the first in the magazine, is locked in position. The same locking takes place when the magazine 36 is prematurely swung upward again.

(2) Preparation of the strap: By the lowering of the pusher 66 which is connected with the slide block 40, the pawl 57 was pushed back by the cooperation of the cutout 70 with the projection 76. This backward pushing had the result that the projection 65 of the pawl 61 snapped into position behind the step 66 of the rod 51 and after the lifting of the plate 66, prevents return of the pawl 57 into active position. At the same time, the pawl 49 was brought out of engagement with the ratchet wheel 48 by the rod 51 so that the roll of strap 30 can be turned freely in the feeding direction.

The strap 32 coming from the roll is now inserted from the rear into the channel 46. If it is still present in the channel from a preceding operation, it can be pushed forward into the window 46 by grasping it by hand. It slides through the lock held in the window 34 and can now be pulled out to a sufficient length and placed around a cable harness located in front of the tool. The loose end is then passed from in front through the lock 4 (FIG. 21), back into the channel. In this connection, it strikes against the pawl 61 and pushes the latter back against the force of the spring 64 so that the interlock is opened and the rod 51 can swing back with the pawl 57. In this way, the free end of the strap is secured against being pulled out of the tool. At the same time, the pawl 49 swings back again into the active position, i.e., the roll 30 cannot be unwound further.

(3) Tightening of the strap: In order to tighten the strap, the knurled wheel 31 which is connected with the roll of strap 30 is turned in the direction indicated by the arrow 102. In this way, the strap portion lying at the bottom in the drawings is pulled back and can be tightened as desired. When the knurled wheel 31 is released, the strap can, however, not move back under its own elastic action since the locking device 48, 49 prevents the wheel from turning backward. The tension which has been achieved is therefore retained.

Between the knurled wheel and the roll there can possibly be inserted a slip clutch which is adjusted to a given frictional force. In this way, a given tensioning force which is at all times the same can be obtained.

(4) Closing of the strap lock: When the desired tension of the strap has been obtained, and the strap 2 is thus taut around the harness 1, the locking of the lock can take place. This is effected in the manner that by pushing-in the pin 81 (FIG. 16), the head of the handle 29 is brought against the swing lever 74 and the handle 29 is then pulled back and the ram 44 (FIG. 15), 22 is thus pushed up.

FIG. 15 shows the handle 29 after it has already moved over a certain distance. It can now no longer move backward should it be by error released since the safety device 91 to 94 will not permit this. Rather the handle 29 must first be brought into the end position shown in FIG. 16 (in other functional relationship), before the safety device 91 to 94 permits it to move back.

In this end position of the handle 29, the pressure ram 44 is in the position shown in FIG. 22. The locking of the lock has in this connection progressed to the stage shown on an enlarged scale in FIG. 9, i.e., it is completed.

(5) The cutting off of the finished tie: The handle 29 has moved back into its rest position indicated in dot-dash line in FIG. 15. The pin 80 is now depressed by means of the knob 84 and the handle 29 thus brought into contact with the swing lever 72.

If the handle is pulled back, the front end 71 of the lever 72 and thus the pusher 66 having a cutting edge 75 moved downward. The strap ends which appear still unsunk in FIG. 22 are therefore cut off and the tool can be released from the finished tie. In this connection, the arrangement can be such that before the cutting of the ends of the strap, the pawl 49 is released so that the strap lying in the channel 46 does not after the cutting rush back because of its tension.

In this connection, the slide block 40 is brought into its lower position so that the tool is now again ready to receive a new lock as set forth under Item 1 in the description of the operation.

The tool of the invention can be modified in various manners as compared with the embodiments specifically described here. Thus, for instance, a relatively simple tool could consist simply of tongs, by which ends of a precut strap extending out of a lock are grasped, of a counter-pressure device which upon the tensioning can be supported with said tongs against the lock and a tensioning device which effects the moving of the supporting device away from the tongs, and finally of a pressure tool for pushing the pin through the lock. This pressure tool need not even form a structural unit with the tensioning device.

In the case of the tool which has been especially described above, the tension could also be produced in some other manner than via the strap roll 30. For example, a simple clamping device could be used for the two ends of the strap extending rearward out of the lock, which could be connected in the same way as the swing levers 72 and 74 alternately with the handle 29 for the purpose of tensioning. Of course, different handles could also be provided for the individual functions.

A further possible modification consists of having the magazine open laterally into the window 34 rather than being placed in front of it, and for the locks contained in said magazine to be directly, without any interlocking device, under spring pressure acting in the direction of the window so that when one lock has been removed from the window, the next is automatically fed from the side. If locks which are not integral from the start with pins are used, another magazine can be provided for the pins. In this connection, it would also be possible not to store the pins individually, but to hold them in stock for instance in the form of a wire rod from which in each case a piece of suitable length is cut off and introduced into the lock.

In many cases, it is possible not to make the cable harness on the spot but to produce it previously on a separate assembly table. In such cases, use is made advisedly of stationary tools in connection with which the functions described above in connection with the hand instrument can be effected by mechanical drive.

What is claimed is:

1. In a device for tieing a bundle of cables or the like by means of a deformable plastic strap, a lock having a slot therein for accommodating at least one end of said strap, said lock being provided with a bore extending substantially transversely of said slot, and a pin of substantially lesser diameter than said bore and penetrating said bore and engaging said strap material in said slot to force a portion of said strap entirely through said bore so as to secure said pin in said bore and hence said strap to said lock, by coaction of the plastic with the pin and the wall of said bore, the end of the bore remote from the pin being beveled and the end of the pin engaging the plastic being deformed in the bevel to further lock said strap.

2. In a device for tieing cable harness of the like by means of a deformable strap, a lock comprising a pair of rigidly connected bridge portions enclosing a slot therebetween for accommodating at least one end of said strap, said lock having at least one pair of aligned bores extending substantially transversely to said slot, and at least one pin of substantially lesser diameter than said bores and penetrating said pair of bores and engaging said strap material in said slot to force a portion of said strap entirely through said bores so as to secure said pin in said bores and hence said strap to said lock, by coaction of the plastic with the pin and the wall of said bores, the end of the bores remote from the pin being beveled and the end of the pin engaging the plastic being deformed in the bevel to further lock said strap.

3. A device as specified in claim 2, in which said lock is rigidly secured to said strap at one end of the latter, said slot in the lock being dimensioned so as to accommodate the other end of said strap.

4. A device as specified in claim 2, in which at the start of a tieing operation said pin is integrally connected to said lock by web means and positioned in one of said bores in a manner such that upon application of a predetermined axial force to said pin said web means will be broken and said pin advanced in the direction toward the other of said bores.

5. A device as specified in claim 2, in which said lock is initially attached to a strip of substantially identical locks interconnected by web material, said lock being separable from said strip of locks by breaking web material.

References Cited

UNITED STATES PATENTS

| | | | |
|---|---|---|---|
| 193,946 | 8/1877 | Hamilton | 24—21 |
| 3,164,250 | 1/1965 | Paxton | 24—30.5 |
| 3,257,694 | 6/1966 | Litwin | 24—16 |
| 3,279,014 | 10/1966 | Fischer | 24—115 |
| 2,126,161 | 8/1938 | Woodward. | |
| 2,160,374 | 5/1939 | Veillette. | |
| 2,896,981 | 7/1959 | Cooney. | |
| 2,994,243 | 8/1961 | Langstroth. | |
| 3,252,213 | 5/1960 | Cuta | 29—522 X |

FOREIGN PATENTS 1,312,063  11/1963  France.

JAMES L. JONES, JR., *Primary Examiner.*